US00RE39629E

(19) United States
(12) Reissued Patent
Yamaji et al.

(10) Patent Number: US RE39,629 E
(45) Date of Reissued Patent: May 15, 2007

(54) SIDE AIR BAG

(75) Inventors: Takeshi Yamaji, Osaka (JP); Toru Ozaki, Aichi (JP)

(73) Assignee: Toyoda Gosei Co., Ltd., Nishi-Kasugai-Gun (JP)

(21) Appl. No.: 10/138,843

(22) Filed: May 2, 2002

Related U.S. Patent Documents

Reissue of:
(64) Patent No.: 6,056,316
Issued: May 2, 2000
Appl. No.: 08/939,527
Filed: Sep. 29, 1997

(30) Foreign Application Priority Data

Oct. 3, 1996 (JP) ..... 8-283055

(51) Int. Cl.
*B60R 21/16* (2006.01)
*B60R 21/20* (2006.01)

(52) U.S. Cl. ..... 280/730.2; 280/743.1; 280/730.1

(58) Field of Classification Search ..... 280/729, 280/730.1, 730.2, 743.1, 743.2
See application file for complete search history.

(56) References Cited

U.S. PATENT DOCUMENTS

| | | | | |
|---|---|---|---|---|
| 3,731,949 | A | 5/1973 | Radke | |
| 3,792,873 | A | 2/1974 | Buchner et al. | |
| 5,011,183 | A | 4/1991 | Thornton et al. | |
| 5,094,477 | A | 3/1992 | Togawa | |
| 5,322,322 | A | 6/1994 | Bark et al. | |
| 5,378,019 | A * | 1/1995 | Smith et al. | 280/743.1 |
| 5,570,900 | A * | 11/1996 | Brown | 280/729 |
| 5,586,782 | A | 12/1996 | Zimmerman, II et al. | |
| 5,588,672 | A * | 12/1996 | Karlow et al. | 280/730.2 |
| 5,788,270 | A | 8/1998 | HÅland et al. | |
| 5,865,465 | A | 2/1999 | Bauer et al. | |
| 5,884,937 | A | 3/1999 | Yamada | |
| 5,899,491 | A | 5/1999 | Tschaeschke | |
| 5,941,564 | A | 8/1999 | Acker | |

FOREIGN PATENT DOCUMENTS

| | | |
|---|---|---|
| DE | 9304294 | 7/1994 |
| DE | 4324487 | 1/1995 |
| DE | 29601497 | 5/1996 |
| GB | 2297950 | 8/1996 |
| JP | 2-158442 | 6/1990 |
| JP | 3-128743 | 5/1991 |
| JP | 5-78946 | 3/1993 |
| JP | 8-26063 | 1/1996 |
| JP | 8-169294 | 7/1996 |
| WO | WO 90/09295 | 8/1990 |
| WO | WO 94/04734 | 3/1994 |

* cited by examiner

*Primary Examiner*—Ruth Ilan
(74) *Attorney, Agent, or Firm*—Jordan and Hamburg LLP

(57) ABSTRACT

A side air bag expands near a window at a time of collision of a vehicle to restrain an occupant from moving in a lateral direction. The air bag has an expansion duration [protracted] *which is extended* to constrain the occupant during overturning of the vehicle. Stowability for stowing the air bag in a folded state in a side structure of the vehicle, such as a pillar and a roof side rail portion, is enhanced in that two woven fabrics are connected along an outer peripheral portion, to form a bag portion, *by* a textile structure woven using a common yarn [include in] *of* both [fabrics] *fabric sheets forming opposing sides of the air bag*. A whole of the bag portion is coated and sealed by an air [non-permeable] *impermeable* coating material to improve air tightness. A mounting portion for mounting the air bag in the side structure, such as a pillar or a roof side rail, is integrally formed by extending the woven fabrics or the common-yarn textile structure portion outward from the outer peripheral connection portion, thereby improving stowability.

18 Claims, 6 Drawing Sheets

FIG. 1 (AMENDED)
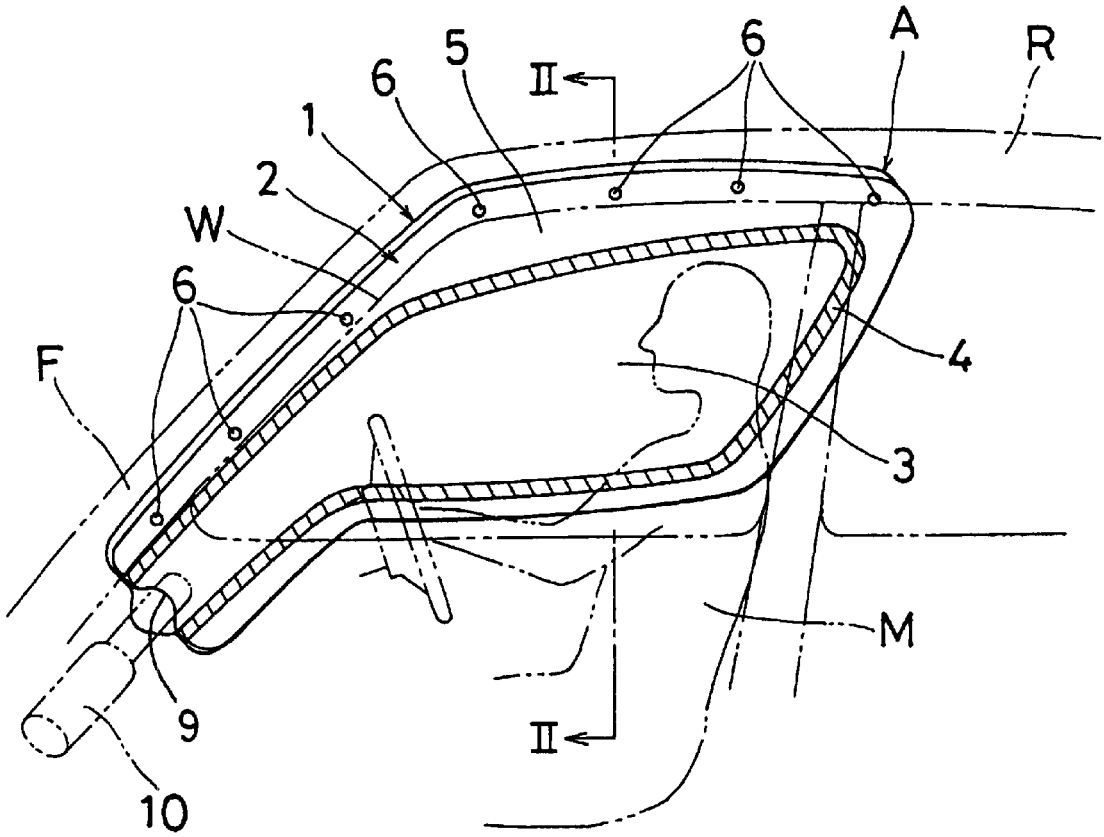

FIG. 6 (AMENDED)
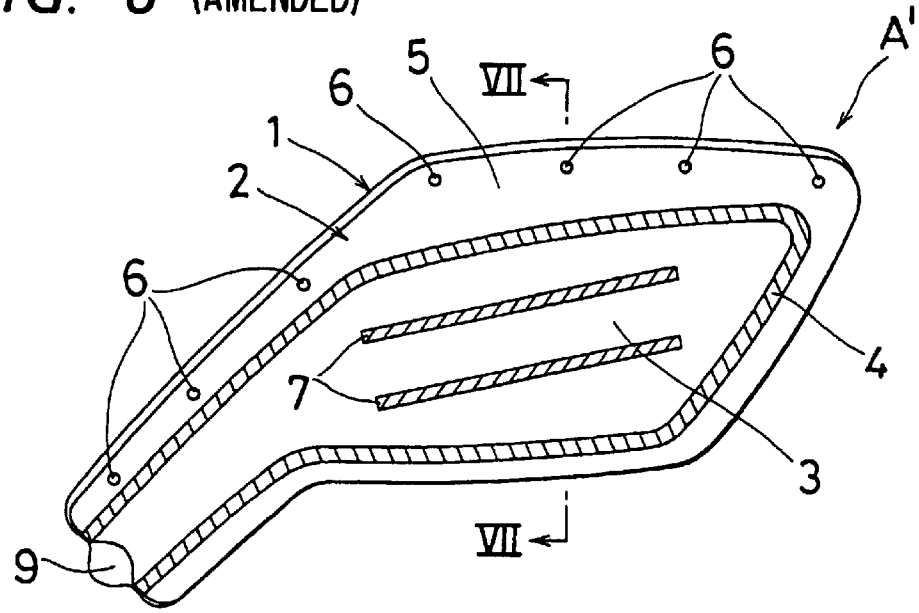
FIG. 7 (AMENDED)
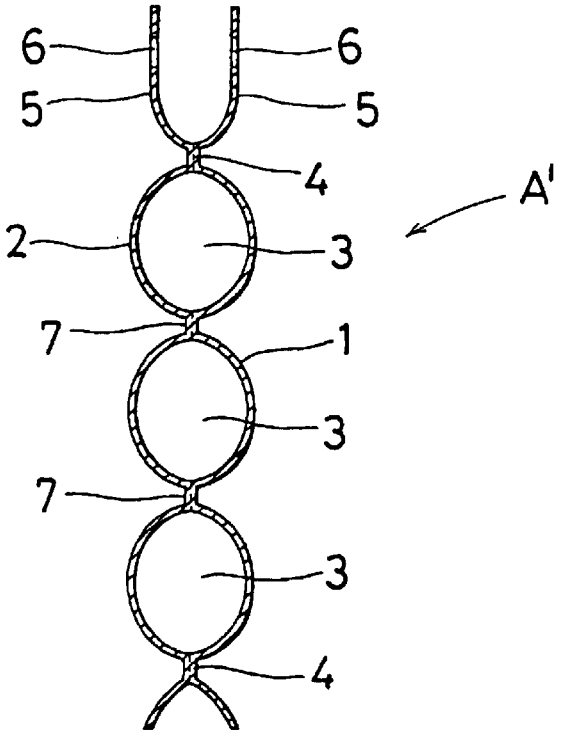

FIG. 11 (AMENDED)
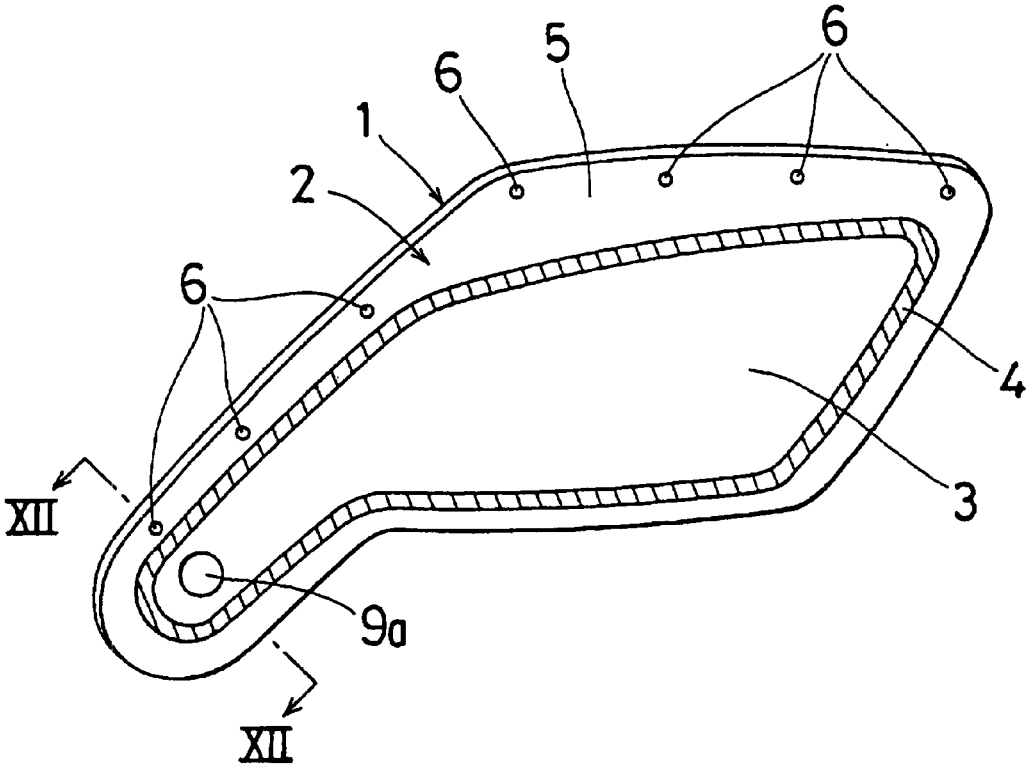
FIG. 12 (AMENDED)
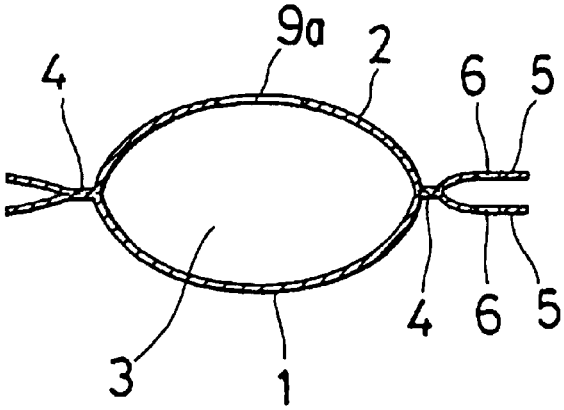

SIDE AIR BAG

Matter enclosed in heavy brackets [ ] appears in the original patent but forms no part of this reissue specification; matter printed in italics indicates the additions made by reissue.

BACKGROUND OF THE INVENTION

The present invention relates to a side air bag which expands near a window of a vehicle at a collision of the vehicle, and particularly relates to a side air bag formed by a woven fabric such as a hollow weave.

An air bag apparatus for a vehicle is an apparatus for constraining a vehicle occupant, i.e. passengers and a driver, by inflating and expanding an air bag at a time of collision of the vehicle, and generally comprises an inflator (a gas generating device) for inflating the air bag in response to a signal from a sensor for detecting [a] predetermined collision characteristics of the vehicle. The air bag is inflated by gas from the inflator. The air bag is formed in a bag shape by a woven fabric.

A so-called hollow weave, in which two fabrics are interwoven as [a] *one* woven fabric [and] *by* a yarn, *partly* constituting each of the *two* fabrics, [partly]*to* form a common textile structure [so as to combine] *of the interwoven* two fabrics, is generally known in weaving for producing industrial materials and the like. There are some examples in which the woven fabric of the hollow weave is used for [ane] *an* air bag, for example, JP-A-02158442 (Japanese Patent Unexamined Publication No. 2-158442) describes a bag formed by the hollow weave. JP-A-03128743 describes [that] connection of [the] woven [fabric] *fabrics* in [the] *a* peripheral portion [is performed] by *a* single-layer joint textile structure [for connection], and similar matter is described in [PCT] WO90/09295 [(PCT/GB90/00215, Japanese Patent National Publication of translated version 4-504988)].

However, the air bags of these references are basically uncoated bags which are woven by hollow weave. The references disclose that air bags can be partly coated or coated, but have no intention for reducing an air-permeability of a fabric by coating.

[On the other hand, while] *While* the conventional air bag apparatus includes *both* an air bag for a driver's seat[,] *and* an air bag for *a* front-passenger seat and the like, a common point thereof is to constrain an occupant from the front within a short time such as some milliseconds to [some ten] *tens of* milliseconds.

[Recently, as an air bag apparatus, in] *In* addition to the above air bag apparatus which constrains the occupant from the front, a side air bag apparatus for constraining the occupant from a left-hand side or a right-hand side is [developed] *known*.

The side air bag is structured such as to be housed in a side structure of the vehicle such as a front pillar, a roof side rail portion, a center pillar, a quarter pillar and the like, and [as to receive] *receives* a gas supplied from an inflator fixed to a bottom part of the front pillar or a neighboring side panel and the like at a time when the vehicle receives a predetermined impact from the side surface thereof so that the air bag inflates and expands near the window along a side surface of a cabin, thereby restraining the occupant from moving in a lateral direction of the vehicle.

[A point in which the] *The* side air bag is [greatly] different from the above [typical-type conventional] *described* air bag [is] *in* that a long expanding time, such as some seconds, is required to be continued for constraining the occupant at a time of overturning of the vehicle.

Accordingly, the [typical-type conventional] *above described* air bag has a function of inflating and expanding for a short time, such as some milliseconds, to [some ten] *tens of* milliseconds and of discharging the gas while constraining the occupant. In contrast to this, in the [newly suggested] side air bag, to meet a constraint requirement of the occupant at a time of overturning of the vehicle, it is required to [set] *have* an expansion holding time [to] *for* a relatively long time such as some seconds.

Further, the [typical-type conventional] air bag mentioned above *for front collision operation* is housed in a relatively large size trim part of the vehicle, such as a horn pad, an instrumental panel, a seat or the like, and a cross sectional area of the air bag in a direction of folded and piled fabrics is about 20 to 150 $cm^2$. However, in the side air bag, since it is housed in a column shaped pillar, a roof side rail portion or the like, there is a problem that the *side* air bag has to be folded in a relatively small cross sectional area such as 4 $cm^2$ [so as to be housed].

SUMMARY OF THE INVENTION

The present invention is made by taking the above described problems into consideration and an object of the present invention is to provide a side air bag housed in a side structure such as a pillar, a roof side rail portion or the like of a vehicle in which an air tightness thereof is improved so that an inflation holding time [can be] *is* protracted and a bulk of a folded air bag is reduced so as to improve [a housing performance for] mounting into the side structure.

In accordance with a first aspect of the present invention [which is suitable for the above object,] there is provided a side air bag having a bag portion formed by connecting two woven fabrics in an outward peripheral portion and having a mechanism for expanding [the] *a* bag portion alongside a window of a vehicle, wherein a connecting portion for connecting the two woven fabrics is formed by weaving a textile structure having a common yarn constituting both fabrics, and the whole [of the] bag portion is sealed by an air [non-permeable] *impermeable* coating material.

In the side air bag having the above structure, a sewing process and a sealing process for sealing stitch perforations in conventional manufacturing methods can be omitted so that an air bag having an air tightness for maintaining inflation duration [an] *on the* order of some seconds [can be] *is* economically manufactured. Further, a side air bag that [can meet] *meets* a requirement for an occupant constraint at a time of overturning of the vehicle [can be] *is* obtained.

In the conventional air bag, the sewn portion has a thickness of two fabrics and [upper and lower threads of] a sewing thread, and in addition to this, a tape for sealing [the] *a* perforation *of the sewing thread* is required. In contrast to this, in accordance with the above side air bag, the connecting portion along the outer periphery of the bag portion can be made thinner than a combined thickness of the two fabrics due to the structure of the textile structure.[and further] *Furthermore*, a sewing thread and a tape [thickness] for sealing the perforation *of the sewing thread* is not required so that the connecting portion becomes significantly thinner in comparison with the conventional air bag. Accordingly, a bulk [in] *of* a folded state is reduced so that the air bag can be housed in the side structure such as an elongated and narrow pillar, roof side rail portion and the like in a compact manner.

Further, in accordance with a second aspect of the present invention, there is provided a *side* air bag [side] having a bag portion formed by connecting two woven fabrics in an outward peripheral portion and housing the bag portion in a side structure of a vehicle, such as a pillar and a roof side rail portion, wherein a connecting portion connecting the woven fabrics is formed by weaving[, as] a *common* textile structure having a common yarn constituting both fabrics[, both fabrics or the]. *The* common textile structure portion is extended further outward from the connecting portion so as to form a mounting portion for mounting in the side structure, and further all said bag portion is sealed by an air [non-permeable] *impermeable* coating material.

In the side air bag having the above structure [, as in the same manner as the above,] an air tightness for maintaining inflation duration on an order of some seconds can also be maintained, and further, [a] housing [performance for housing into] *in* the side structure such as the pillar and the like is improved. In addition to this, [a housing performance for] housing a mounting portion into the pillar and the like can be particularly improved, while the mounting portion can be formed without sewing a specially prepared fabric for the mounting.

Accordingly, in the case that the peripheral portion of the connecting portion is extended so as to integrally form the mounting portion *for mounting* to the pillar and the like, if both of the two woven fabrics are extended from the portion of the common textile structure, a mounting portion *formed* of two sheets piled without a continuous stitch can be formed. [and further] *Furthermore,* if one of the woven fabrics is extended, the mounting portion [having an improved housing performance] can be formed [with] *having a* single sheet thickness *to improve stowability*. Further, if the portion of the common textile structure is extended as it is, [the] *a* mounting portion having a [higher] *greater* strength [can be] *is* formed.

In the case that the mounting portion [is consisting] *consists* of two fabric sheets, after separating [up these] *the* two fabrics [so as to be opened] *sheets*, if [the] *a* coating is also applied to an inner side between the two [fabrics] *fabric sheets* in the mounting portion, that is, to and around the peripheral edge of the common textile structure, the sealability of the mounting portion [can be] *is* further improved.

In the side air bag in accordance with each of the above inventions, a linear connecting portion, [for] partitioning *the bag portion* in parallel with a flow direction of an inflator gas, is formed to connect *the* two [woven fabrics constituting] *fabric sheets at a position of* the bag portion[, at] *corresponding to* a center region of *the* bag portion[, and wherein the]. The connecting portion [for partitioning] is formed by weaving [as] a textile structure having a common constituting yarn [for] *of* both [fabrics] *of the two fabric sheets*. Accordingly, an appropriate expansion shape [can be] *is* easily set, and the thickness of the connecting portion [for partitioning becomes] *is* thinner than [the] *a* thickness of the two [fabrics] *fabric sheets* so that the housing [performance for housing] in the side structure, such as the pillar and the like, [can be]*is* improved.

Further, the connecting portion [for partitioning] at the center region of the bag portion may be formed by a stitch, and an inflator-side terminal portion of the stitch may be formed [as] *in* a U-shape or a circular shape. In this case, the inflating shape [can be] *is* controlled and a stress concentration on the inflator-side terminal portion at a time of inflation of the air bag can be eased.

Still further, an opening for introducing an inflator gas can be formed in a part of the connecting portion.

BRIEF DESCRIPTION OF THE DRAWINGS

FIG. 1 is a front view which shows a side air bag in accordance with a first embodiment of the present invention;

FIG. 6 is a front view which shows a side air bag in accordance with a second embodiment of the present invention;

FIG. 7 is a cross-sectional view along a line [Y—Y] *VII—VII* in FIG. 6;

FIG. 11 is a front view of an air bag which shows an embodiment of an opening for mounting an inflator; and FIG. 12 is a cross sectional view along a line [Z—Z] *XII—XII* in FIG. 11.

DETAILED DESCRIPTION OF THE PREFERRED EMBODIMENT

Figure 2:
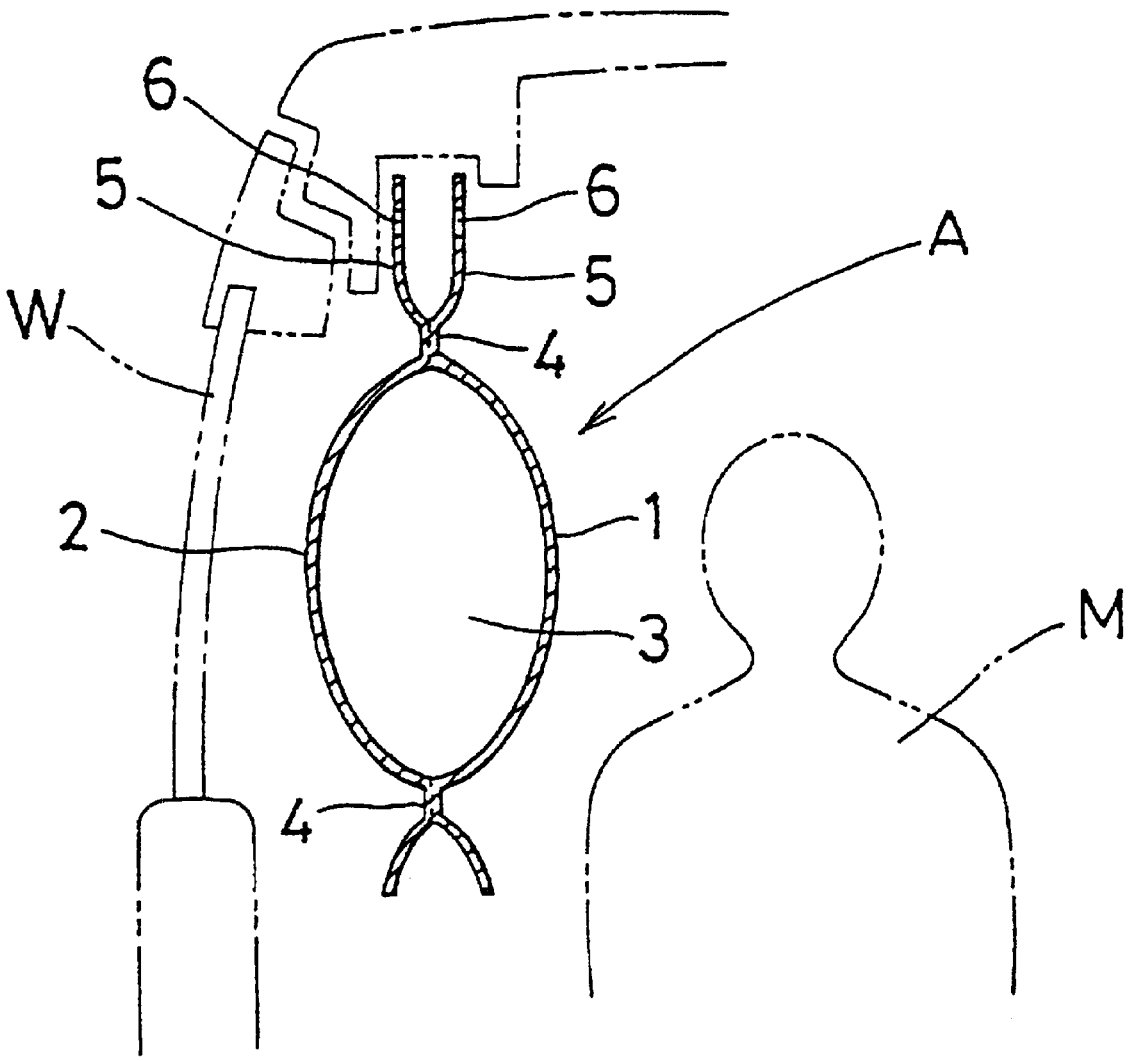
FIG. 2 is a cross-sectional view along a line [X—X] *II—II* in FIG. 1.

An embodiment in accordance with the present invention will be explained below with reference to the accompanying drawings. [however,]*However*, the present invention is not limited to [this] *embodiments in the drawings*.

FIGS. 1 and 2 show a side air bag A in accordance with a first embodiment of the present invention and in these drawings, in order to show a used state of the side air bag, a part of a vehicle and an occupant are respectively shown by a chain line.

When a sensor detects a predetermined impact from a side surface of the vehicle, the side air bag A inflates and expands near a window W along a side surface of a cabin in response to a signal from the sensor, thereby constraining mainly a head of an occupant M from a left-hand side or right-hand side. The side air bag A also works at a time of lateral tumbling of the vehicle.

The air bag A is structured such that a bag portion 3 is formed by connecting two woven fabrics 1 and 2 [which are] *each* formed by a plain weaving, at an outer periphery thereof, as shown in the drawings. In this example, a front edge and an upper edge of the bag portion 3 is formed such as to substantially correspond to a curve extending from a front pillar F to a roof side rail portion R of the vehicle and to substantially *form a* shape *of* a parallelogram in an expanded form along the window W so as to be naturally folded and housed in a side structure of the vehicle such as the front pillar F, the roof side rail portion R and the like.

Further, a front end portion of the air bag A is provided with an opening 9, for mounting an inflator *10*, [a part of which is extended] *and extends* in pipe-like shape. [to be opened, and for example, an]*The* inflator 10 *is* mounted to a bottom part of the front pillar F *and* is connected [thereto] *to the opening 9*.

The air bag A is formed by a hollow weaving, in which a connecting portion 4 disposed along an outer periphery of *both of* the [both] woven fabrics 1 and 2 is woven as a textile structure having a common yarn (a warp yarn or a weft yarn) constituting each of the [both] *two woven* fabrics[, that is, by a] *1 and 2. Thus, the* textile structure *is* of *a* single layer *construction*. Further, by extending both of the woven fabrics 1 and 2 outward from the connecting portion 4, a mounting portion 5 *for mounting* to [the] *a* side structure, such as the front pillar F, the roof side rail portion R and the like, is integrally formed. [A mounting hole] *Mounting holes* 6 *are* for [a] *receiving* fixing [bolt or a rivet is] *bolts or rivets and are* formed [on] *in* the mounting portion 5.

Still further, all the surface of the bag portion 3, including the outer peripheral connecting portion 4, is coated [for sealing] *and sealed* by an air [non-permeability] *impermeable* coating material (not shown) such as a silicone rubber, a chloroprene rubber or the like so as to improve an air tightness to provide an expansion holding time [for] *of* about 5 seconds.

Figure 3:
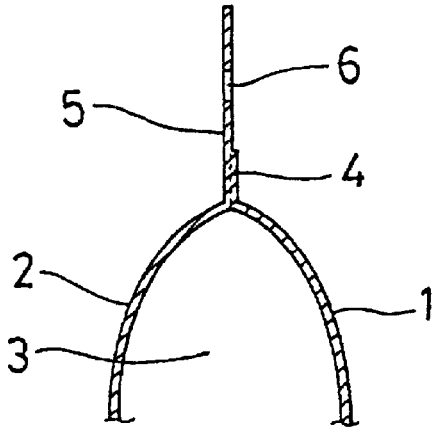
FIG. 3 is a cross-sectional view which shows an embodiment of a mounting portion of the air bag.
Figure 4:
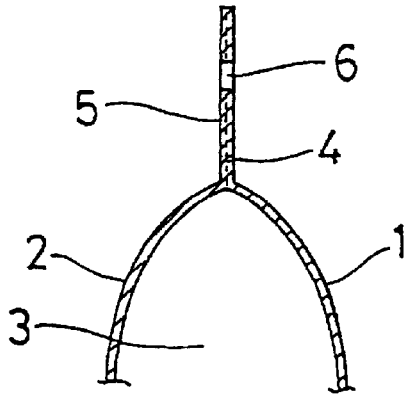
FIG. 4 is a cross-sectional view which shows another embodiment of the mounting portion of the air bag.

The mounting portion 5 can be formed by *the* two woven fabrics 1 and 2 as shown in FIG. 2, and can be also formed by extending any one of the fabrics 1 and 2 as shown in FIG. 3, or by extending[, as it is,] the common textile structure portion formed by a hollow weave from the connecting portion 4 as shown in FIG. 4.

Figure 5:
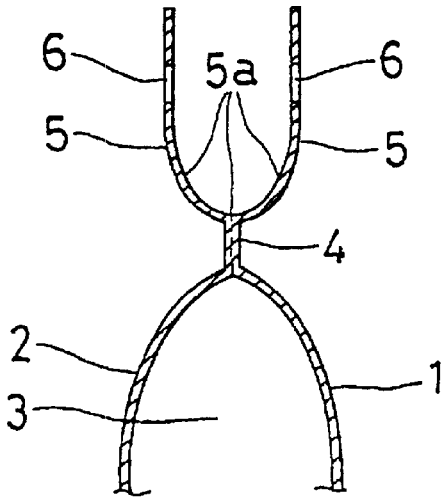
FIG. 5 is a cross-sectional view which shows [a coating] *an area to be coated* inside the mounting portion.

[In the case that] *Referring to FIG. 5,* the mounting portion 5 is formed by the two fabrics 1 and 2, *and* the air tightness of the bag portion 3 can be improved by coating an inner side 5a of the fabric in the mounting portion 5 *with the coating material*, particularly near the common textile structure portion [by the coating material (not shown) as shown in FIG. 5].

A side air bag in accordance with a second embodiment of the present invention is shown in FIGS. 6 and 7.

[The] *An* air bag [A] *A'* in accordance with [this] *the second* embodiment is provided with a connecting portion 7 for partitioning *the air bag A'*, in addition to the structure of the side air bag *A* in accordance with the first embodiment. In FIGS. 6 and 7, the same reference numerals designate the same elements as in FIG. 1.

Accordingly, the side air bag [A] *A'* in accordance with the second embodiment is structured as follows. The connecting portion 4 along the outer periphery of the two woven fabrics 1 and 2 is made of the common textile structure by a hollow weave so as to form the bag portion 3. Two linear connecting portions 7 [for partitioning], which are substantially parallel to a flow direction of the inflator gas, are formed to connect the two woven fabrics 1 and 2[.] at the center region of the bag portion 3, as shown in the drawing. Further, the connecting [portion] *portions* 7 [for partitioning is] *are* woven as [formed by] the textile structure having a common yarn constituting *both of* the [both] woven fabrics 1 and 2, [as] in the same manner as that of the connecting portion 4.

The connecting portion 7 for partitioning is provided for the purpose of controlling the expanding shape of the air bag during an inflating process so that a suitable inflated shape [can be] *is* set. Further, the thickness thereof is thinner than the combined thickness of the two fabrics, [as] in the same manner as that in the outer peripheral connecting portion 4[, so as to be]. *Thus, the air bag A' is* easily folded and housed in the pillar and the like.

Figure 8:
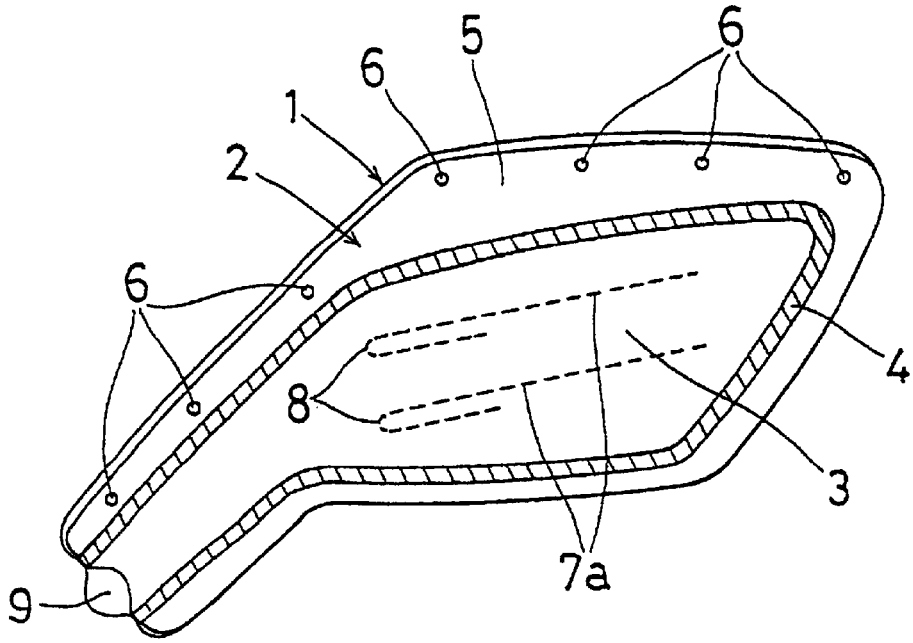
FIG. 8 is a front view which shows a side air bag in which a connecting portion [for partitioning] is formed by [a] sewing *together two fabric sheets*.
Figure 9:
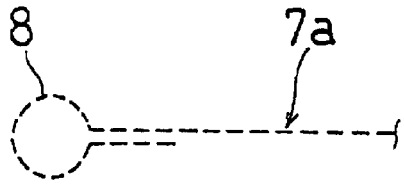
FIG. 9 is an enlarged view which shows a shape of *a* terminal portion of a stitch.
Figure 10:
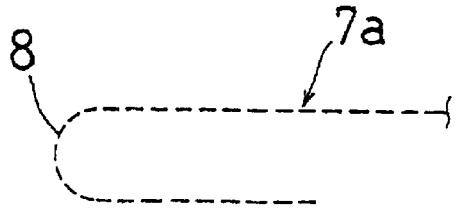
FIG. 10 is an enlarged view which shows another embodiment of the shape of terminal portion of a stitch.

In another embodiment, for example as shown in FIG. 8, [the] *a* similar connecting portion [7 for partitioning can be] *7a is* formed by sewing *first and second center connecting portions 7a, 7a, at upper and lower levels, which are discontinuous with each other and with the outer peripheral connecting portion 4 such that a first expansible region is formed between said first and second center connecting portions 7a, 7a and has first and second ends, a second expansible region is formed between said first center connecting portion 7a at the upper level and the peripheral connecting portion 4 and has first and second ends, a third expansible region is formed between the second center connecting portion 7a at the lower level and the peripheral connecting portion 4 and has first and second ends, and the first and second ends of each of the first expansible region, the second expansible region, and the third expansible region respectively communicate with each other*. In this case, in order to ease a stress concentration during expansion of the air bag, as respectively shown in FIG. 9 and FIG. 10, it is preferable to form [a] *an* inflator-side terminal portion 8 [of stitching] (a terminal portion 8 [of stitch] *stitched* close to the inflator) [as] *by stitching* a circular shape having a diameter of about 3 to 30 mm or a U-shape having a width of about 3 to 30 mm. Further, [a perforation of the stitch does] *perforations formed by the stitching do* not deteriorate the air tightness of the air bag since [the] coating [using] the coating material *on the air bag* is performed in a later step.

FIGS. 11 and 12 show another embodiment of the inflator mounting opening [portion 9] *9a* in the air bag A.

In each of the above embodiments, the opening [portion] 9 is formed by extending a part of the bag portion 3 in *a* pipe-like shape [so as to open the part] *to an opening* of the connecting portion 4[; however, the]. *However, an* opening [9] *9a* can be formed on one of the woven fabrics 1 and 2 by [a] laser cutting and the like, as shown in the drawings, after a bag portion having no opening is formed [in] *by* the connecting portion 4.

The side air [bag A] *bags* in accordance with [each of above-described] *the above* embodiments [is] *are* formed by a so-called hollow weave, [as]*which is* the *common* textile [having the] *structure combining the two fabrics and having* common constituting yarn [in] *of the two fabrics. The hollow weaves forms* the connecting portion 4 at the outer periphery of the bag portion and the surface of the air bag is coated. Therefore, an air bag can be manufactured without the conventional sewing step and the sealing step *for* sealing the [stitch perforation] *the perforations cause by stitching*. Thus, the air bag [which] can maintain a long inflation duration[.] for constraining the occupant at a time of overturning of the vehicle, *and* can be easily and economically manufactured.

Further, the connecting portion 4 can be made thinner than the combined thickness of the two woven fabrics, while the sewing thread and the tape for sealing the [stitch perforation] *perforations from stitching* are not required. For this reason, the connecting portion *4* is made thinner than that of the conventional air bag and the air bag can be easily folded and housed in the side structure of the vehicle such as the elongated and narrow pillar and the like.

Further, since the mounting portion [to] *for mounting to* the side structure can be integrally formed by the fabric extending from the [circular woven] *common textile* structure [or the circular woven structure portion], it is unnecessary to sew the fabric for the mounting portion separately *and* the mounting portion [can be] *is* formed thin so as to improve [the housing performance, and] *stowability. Furthermore,* a number of [the] parts and [the] manufacturing steps can be reduced so that [the economical] *economic* efficiency can be further improved.

Whereas the embodiments of the present invention have been explained as above, the side air bag of the present invention can be housed and mounted to a side structure of the vehicle other than the pillar or the roof side rail portion.

What is claimed is:

1. A side air bag for inflation by an inflator mechanism for expanding the side air bag alongside a window of a vehicle, comprising:

a bag portion formed by two woven fabric [panels] *sheets* connected along [an] outer peripheral [portion] *portions thereof* by a peripheral connecting portion;

said peripheral connecting portion for connecting said two woven fabric [panels] *sheets* being formed by weaving a textile structure having a common yarn included in both *of* said two woven fabric [panels] *sheets*;

said bag portion sealed over a whole area thereof by an air [non-permeable] *impermeable* coating material;

a linear connecting portion for partitioning [in] *said bag portion, said linear connecting portion extending* parallel [with] *to* a flow direction of an inflator gas *and being* formed [on] *at* a center region of said bag portion by stitching connecting said two woven fabric [panels] *sheets*; and an inflator-side [teal] *terminal* portion of the stitching being formed having one of a U-shape [or] *and* a circular shape.

2. The side air bag as recited in claim 1, wherein an opening for introducing an inflator gas is formed in a part of said peripheral connecting portion.

3. The side air bag according to claim 1 wherein said peripheral connecting portion is non-continuous [having] *and has* a gap [to form] *forming* an opening for introducing an inflator gas, said opening being defined by said peripheral connecting portion and said two woven fabric [panels] *sheets*.

4. The side air bag as recited in claim 3, wherein *said bag portion has a cylindrical duct extending therefrom and* said opening [extends to form a] *is provided at an end of said* cylindrical duct.

5. The side air bag as recited in claim 3 or claim 4, wherein said opening is disposed at a front end part of the bag portion which is for positioning at a front side of the vehicle.

6. The side air bag as recited in claim [3] *1* or claim [1] *3*, wherein one of said two woven fabric [panels] *sheets* or said textile structure is extended outwardly from said peripheral connecting portion to form a mounting portion for mounting to a side structure of the vehicle.

*7. A side air bag mounted on a roof side rail of a vehicle, for inflation by an inflator mechanism for expanding the side air bag alongside a window of a vehicle, comprising:*

*a bag portion formed by two woven fabric sheets connected along outer peripheral portions thereof by a peripheral connecting portion;*

*a center connecting structure, in a center region of said bag portion, connecting said two woven fabric sheets;*

*a terminal portion of said center connecting structure being formed in a circular shape; and*

*an air impermeable coating material being applied on a surface of said bag portion including said peripheral connecting portion and said center connecting structure after formation of said center connecting structure to seal said center connecting structure.*

*8. The side air bag according to claim 7, wherein said peripheral connecting portion for connecting said two woven fabric sheets is formed by weaving a textile structure having a common yarn included in both of said two woven fabric sheets.*

*9. The side air bag according to claim 7, wherein said center connecting structure is formed by stitching.*

*10. The side air bag according to claim 7, wherein said center connecting structure has two ends and an upstream-side terminal portion is formed as the terminal portion.*

*11. The side air bag according to claim 7 wherein:*

*said center connecting structure extends along a connecting portion length to said terminal portion; and*

*said circular shape defines a diameter greater than a width of said center connecting structure along said connecting portion length.*

*12. The side air bag according to claim 7, wherein said bag portion defines an inflation opening for introduction of gas by the inflator mechanism and said terminal portion is disposed at an end of said center connecting structure proximate said inflation opening.*

*13. A side air bag mounted on a roof side rail of a vehicle, for inflation by an inflator mechanism for expanding the side air bag alongside a window of a vehicle, comprising:*

*a bag portion formed by two woven fabric sheets connected along outer peripheral portions thereof by a peripheral connecting portion;*

*a center connecting structure, in a center region of said bag portion, connecting said two woven fabric sheets;*

*a terminal portion of said center connecting structure being formed in a U-shape; and*

*an air impermeable coating material being applied on a surface of said bag portion including said peripheral connecting portion and said center connecting structure after formation of said center connecting structure to seal said center connecting structure.*

*14. The side air bag according to claim 13, wherein said peripheral connecting portion for connecting said two woven fabric sheets is formed by weaving a textile structure having a common yarn included in both of said two woven fabric sheets.*

*15. The side air bag according to claim 13, wherein said center connecting structure is formed by stitching.*

*16. The side air bag according to claim 13, wherein said center connecting structure has two ends and an upstream-side terminal portion is formed as the terminal portion.*

*17. The side air bag according to claim 13 wherein:*

*said center connecting structure extends along a connecting portion length to said terminal portion; and*

*said U-shape defines a width greater than a width of said center connecting structure along said connecting portion length.*

*18. The side air bag according to claim 13, wherein said bag portion defines an inflation opening for introduction of gas by the inflator mechanism and said terminal portion is disposed at an end of said inner connecting structure proximate said inflation opening.*

* * * * *